US006678641B2

(12) United States Patent
Gibbs et al.

(10) Patent No.: US 6,678,641 B2
(45) Date of Patent: Jan. 13, 2004

(54) SYSTEM AND METHOD FOR SEARCHING SELECTED CONTENT USING SENSORY DATA

(75) Inventors: Simon Gibbs, San Jose, CA (US); Sidney Wang, Pleasanton, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 82 days.

(21) Appl. No.: 09/925,128

(22) Filed: Aug. 8, 2001

(65) Prior Publication Data

US 2003/0036887 A1 Feb. 20, 2003

(51) Int. Cl.[7] .............................................. H04B 15/00
(52) U.S. Cl. ....................... 702/189; 702/189; 702/122; 702/76; 348/109; 348/107; 348/96; 725/104; 725/87; 345/723
(58) Field of Search ................... 702/75, 76, 122–126, 702/179, 189, FOR 103, 104, 134, 170, 171; 348/96, 107, 108; 725/86–104; 345/723

(56) References Cited

U.S. PATENT DOCUMENTS 5,123,057 A * 6/1992 Verly et al. .................... 382/37
5,481,296 A * 1/1996 Cragun et al. ................ 348/13
2001/0049826 A1 * 12/2001 Wilf ............................ 725/120
2002/0138562 A1 * 9/2002 Wies et al. .................. 709/203

OTHER PUBLICATIONS

Hiraiwa et al., A Fully Automated Object Extraction from Video Stream, Sep. 1999, IEEE, pp. 174–178.*

* cited by examiner

*Primary Examiner*—Marc S. Hoff
*Assistant Examiner*—Elias Desta
(74) *Attorney, Agent, or Firm*—Valley Oak Law (57) ABSTRACT

The invention illustrates a system and method of searching for a specific segment within a stream of content data comprising: receiving a stream of sensory data corresponding with the stream of content data; comparing the stream of sensory data with a search criteria; identifying the specific segment of the stream of content data corresponding to a match between the stream sensory data and the search criteria; setting the search criteria based upon parameters of the stream of sensory data; and applying a threshold to determine the match between the stream of sensory data and the search criteria.

21 Claims, 7 Drawing Sheets

SYSTEM AND METHOD FOR SEARCHING SELECTED CONTENT USING SENSORY DATA

FIELD OF THE INVENTION

The invention relates generally to the field of audio/visual content, and more particularly searching for specific content within an audio/visual segment.

BACKGROUND OF THE INVENTION

Being able to record audio/visual programming allows viewers greater flexibility in viewing, storing and distributing audio/visual programming. Viewers are able to record and view video programs through a computer, video cassette recorder, digital video disc recorder, and digital video recorder. With modern storage technology, viewers are able to store vast amounts of audio/visual programming. However, attempting to locate and view stored audio/visual programming often relies on accurate, systematic labeling of different audio/visual programs. Further, it is often time consuming to search through numerous computer files or video cassettes to find a specific audio/visual program.

Even when the correct audio/visual programming is found, viewers may want to view only a specific portion of the audio/visual programming. For example, a viewer may wish to see only highlights of a golf game such as player putting on the green instead of an entire golf tournament. Searching for specific events within a video program would be a beneficial feature.

Without an automated search mechanism, the viewer would typically fast forward through the program while carefully scanning for specific events. Manually searching for specific events within a program can be inaccurate and time consuming.

Searching the video program by image recognition and metadata are methods of identifying specific segments within a video program. However, image recognition relies on identifying a specific image to identify the specific segments of interest. Unfortunately, many scenes within the entire video program may have similarities which prevent the image recognition from identifying the specific segments of interest from the entire video program. On the other hand, the target characteristics of the specific image may be too narrow to identify any of the specific segments of interest.

Utilizing metadata to search for the specific segments of interest within the video program relies on the existence of metadata corresponding to the video program and describing specific segments of the video program. The creation of metadata describing specific segments within the video program is typically a labor-intensive task. Further, the terminology utilized in creating the metadata describing specific segments is subjective, inexact and reliant on interpretation.

SUMMARY OF THE INVENTION

The invention illustrates a system and method of searching for a specific segment within a stream of content data comprising: receiving a stream of sensory data corresponding with the stream of content data; comparing the stream of sensory data with a search criteria; identifying the specific segment of the stream of content data corresponding to a match between the stream sensory data and the search criteria; setting the search criteria based upon parameters of the stream of sensory data; and applying a threshold to determine the match between the stream of sensory data and the search criteria.

Other aspects and advantages of the invention will become apparent from the following detailed description, taken in conjunction with the accompanying drawings, illustrated by way of example of the principles of the invention.

DETAILED DESCRIPTION

Specific reference is made in detail to the embodiments of the invention, examples of which are illustrated in the accompanying drawings. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

Figure 1:
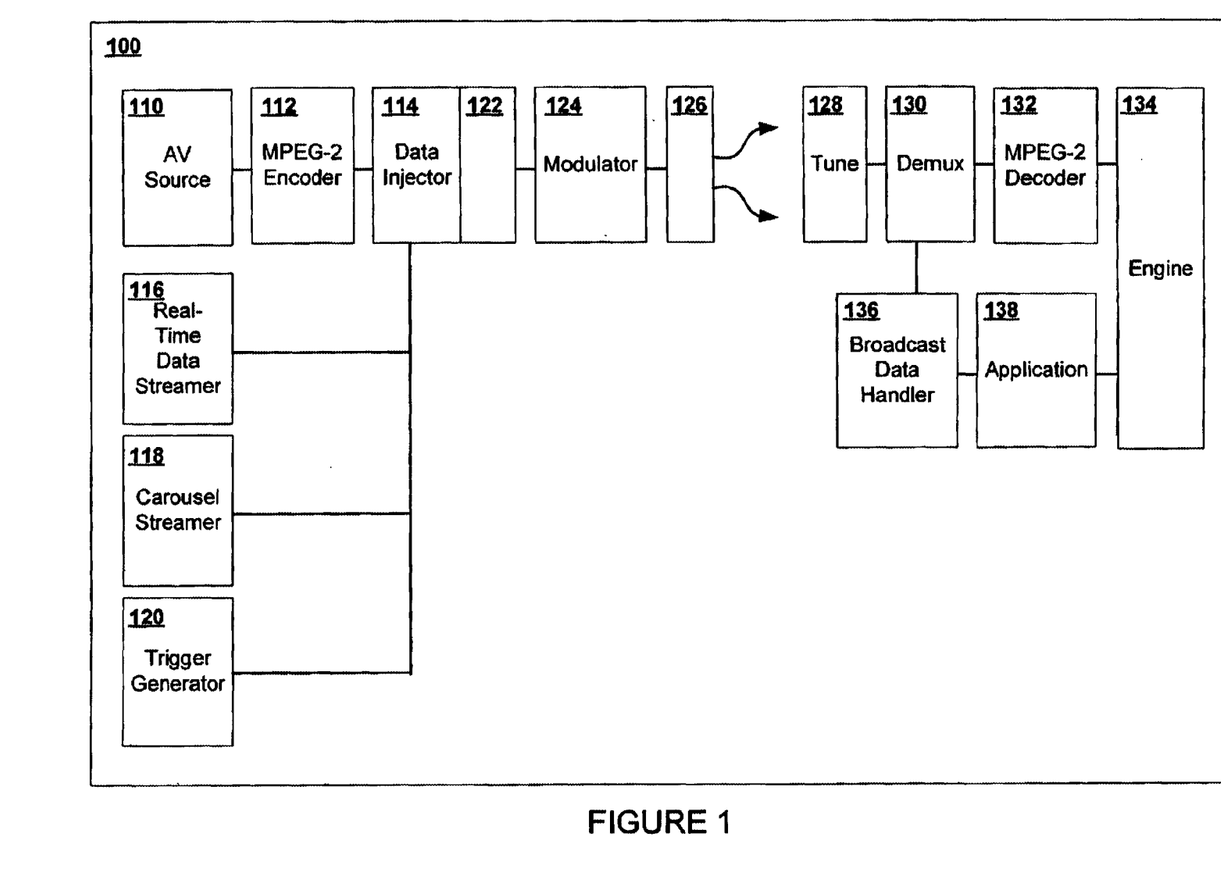
FIG. 1 illustrates one embodiment of a system overview according to the invention.

With reference to FIG. 1, a system 100 is shown for searching and identifying an audio/visual segment for specific content according to one embodiment of the invention. The system 100 utilizes sensory data for performing the search for a specific audio/visual segment within the audio/visual data stream. The sensory data corresponds with the video data in real time; the sensory data and video data are temporally correlated, for example by the use of timestamps In one embodiment, the system 100 includes an audio/visual (A/V) source 110, an MPEG-2 encoder 112, a data injector 114, a real-time data streamer 116, a carousel streamer 118, a trigger generator 120, an A/V and data transport stream 122, a modulator 124, a transmitter 126, a tuner 128, a demultiplexer 130, an MPEG-2 decoder 132, a presentation engine 134, a broadcast data handler 136, and an application module 138. Additional specific elements common in computer system such as processors, memory, user interfaces, system busses, storage devices, and the like are not shown to prevent unnecessarily obscuring the aspects of the invention.

The components 110–138 are merely illustrated in FIG. 1 as one embodiment of the system 100. Although the components 110–138 are illustrated in FIG. 1 as separate components of the system 100, two or more of these components may be integrated, thus decreasing the number of components in the system 100. Similarly, the components 110–138 may also be separated, thus increasing the number of components within the system 100. Further, the components 110–138 may be implemented in any combination of hardware, firmware and software.

The A/V source 110 is connected to the MPEG-2 encoder 112 and provides the MPEG-2 encoder with A/V content. The A/V source 110 includes a video camera, a video cassette recorder, a digital recorder, or other means for providing A/V content. The MPEG-2 encoder 112 receives the A/V content and encodes this content to form an encoded A/V data stream according the MPEG-2 standard which is well known in the art. In other embodiments, other A/V encoders such as MPEG-1 or MPEG-4 may be utilized.

The MPEG-2 encoder 112, the real-time data streamer 116, the carousel streamer 118 and the trigger generator 120 are connected to the data injector 114. The real-time data streamer 116 provides the data injector 114 with sensory data which describes and corresponds in real-time with the A/V content from the A/V source 110. Sensory data describes in real-time physical aspects or conditions that correspond with the A/V content. The carousel streamer 118 provides the data injector 114 with assets (e.g., images, audio clips, text files) related to the user interface. The trigger generator 120 provides the data injector 114 with data used to activated predefined actions on the receiver (e.g., authored questions for a trivia game or poll, advertisement names for pop-up ad inserts).

The data injector 114 receives incoming data from the MPEG-2 encoder 112, the real-time data streamer 116, the carousel streamer 118, and the trigger generator 120. The data injector 114 synchronizes the incoming data such that the data from the real-time data streamer 116, carousel streamer 118, and trigger generator 120 are timed with the corresponding encoded A/V data stream. The data injector 114 is connected to the A/V and data transport stream 122 and feeds the synchronized data through the A/V and data transport stream 122 to the modulator 124.

The modulator 124 receives the synchronized data. The synchronized data includes the encoded A/V data stream and associated data from the real-time data streamer 116, carousel streamer 118, and trigger generator 120. The modulator 124 broadcasts this synchronized data through the transmitter 126. The transmitter 126 may broadcast through air, cable, phone lines, and the like.

The tuner 128 receives the synchronized data which is broadcasted through the transmitter 126. The demultiplexer 130 is connected to the tuner 128 and receives the synchronized data from the tuner 128. The demultiplexer 130 separates the encoded A/V data stream from other data originally from the real-time data streamer 116, carousel streamer 118, and trigger generator 120. The MPEG-2 decoder 132 is connected to the demultiplexer 130 and receives the encoded A/V data stream from the demultiplexer 130. The broadcast data handler 136 is connected to the demultiplexer. The data from the real-time data streamer 116, carousel streamer 118, and trigger generator 120, is received by the broadcast data handler 136 from the demultiplexer 130.

The MPEG-2 decoder processes the encoded A/V data stream and returns a decoded A/V data stream which is either identical or nearly identical to the original A/V data stream from the A/V source 110. Similar to the MPEG-2 encoder 112, the MPEG-2 decoder 132 may be substituted with other A/V encoders such as MPEG-1 or MPEG-4. The MPEG-2 decoder 132 is connected with the presentation engine 134. The presentation engine 134 receives the decoded A/V data stream from the MPEG-2 decoder 132.

The broadcast data handler 136 is connected to the application module 138. The broadcast data handler 136 reformats the data from the transport stream into data that the application module 138 can utilize. The data from the real-time data streamer 116, carousel streamer 118, and trigger generator 120 is received by the application module 138. The application module 138 utilizes the data from the real-time data streamer 116, carousel streamer 118, and trigger generator 120. The application module 138 also interacts with the presentation engine 134. In one embodiment, the application module 138 sends instructions to the presentation engine 134 to display selected segments of the decoded A/V data stream. In another embodiment, the application module 138 sends instructions to the presentation engine 134 to alter or modify the decoded A/V data stream to indicate the selected segment of the decoded A/V data stream. Additional details of the application module 138 are illustrated in the following text and illustrated in the corresponding figures.

Figure 2:
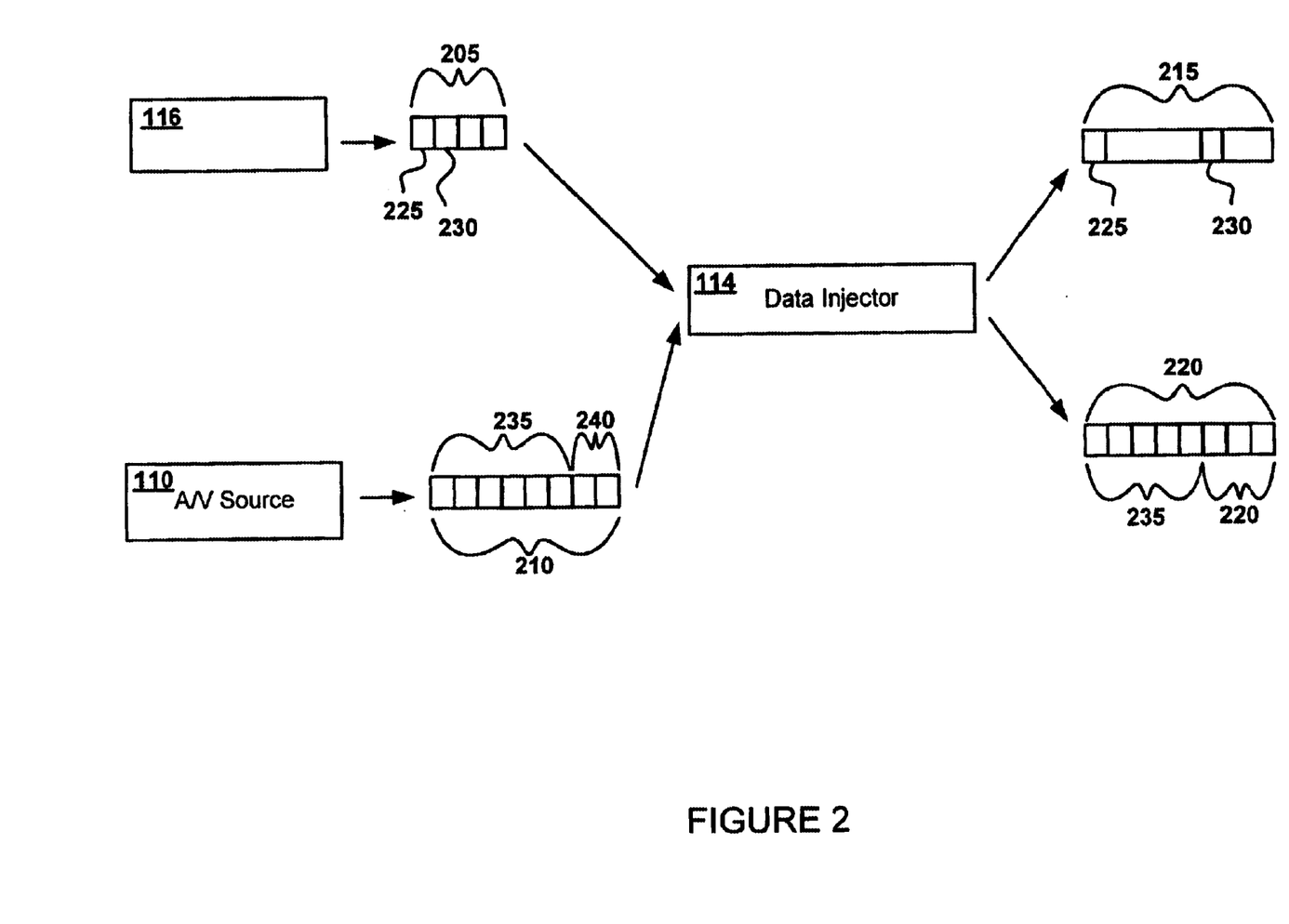
FIG. 2 illustrates an exemplary data flow according to the invention.

FIG. 2 illustrates a data flow diagram showing the data injector 114 according to one embodiment of the invention. The real-time data streamer 116 (FIG. 1) sends a sequence of sensory data 205 to the data injector 114 (FIG. 1.) The A/V source 110 (FIG. 1) sends a sequence of A/V data 210 to the data injector 114. This sequence of sensory data 205 represents sensory data such as force and positional data. The segments of the sequence of sensory data 205 correspond to specific segments of the sequence of A/V data 210. In one embodiment, the data injector 114 synchronizes the sequence of sensory data 205 and the sequence of A/V data 210 with respect to time. The data injector 114 matches appropriate data from the sequence of sensory data 205 to the corresponding segment of the sequence of A/V data 210. The data injector 114 outputs a synchronized sensory data stream 215 and a corresponding synchronized A/V data stream 220. The synchronized data stream 215 contains the sensory data within the sequence of sensory data 205. However, the sensory data within the synchronized sensory data stream 215 is timed to correspond appropriate segments within the synchronized A/V data stream 220.

For example, the sequence of sensory data 205 includes a first sensory data block 225 and a second sensory data block 230. Within the sequence of sensory data 205, the first sensory data block 225 is adjacent the second sensory data block 230. In addition, the sequence of A/V data 210 includes a first A/V segment 235 and a second A/V segment 240. After the data injector 114 generates the synchronized sensory data stream 215 and the synchronized A/V data stream 220, the first sensory data block 225 is no longer adjacent to the second sensory data block 230. Within the synchronized sensory data stream 215 and the synchronized A/V data stream 220, the first sensory data block 225 corresponds with the first A/V segment 235; the second sensory data block 230 corresponds with the second A/V segment 240.

Figure 3:
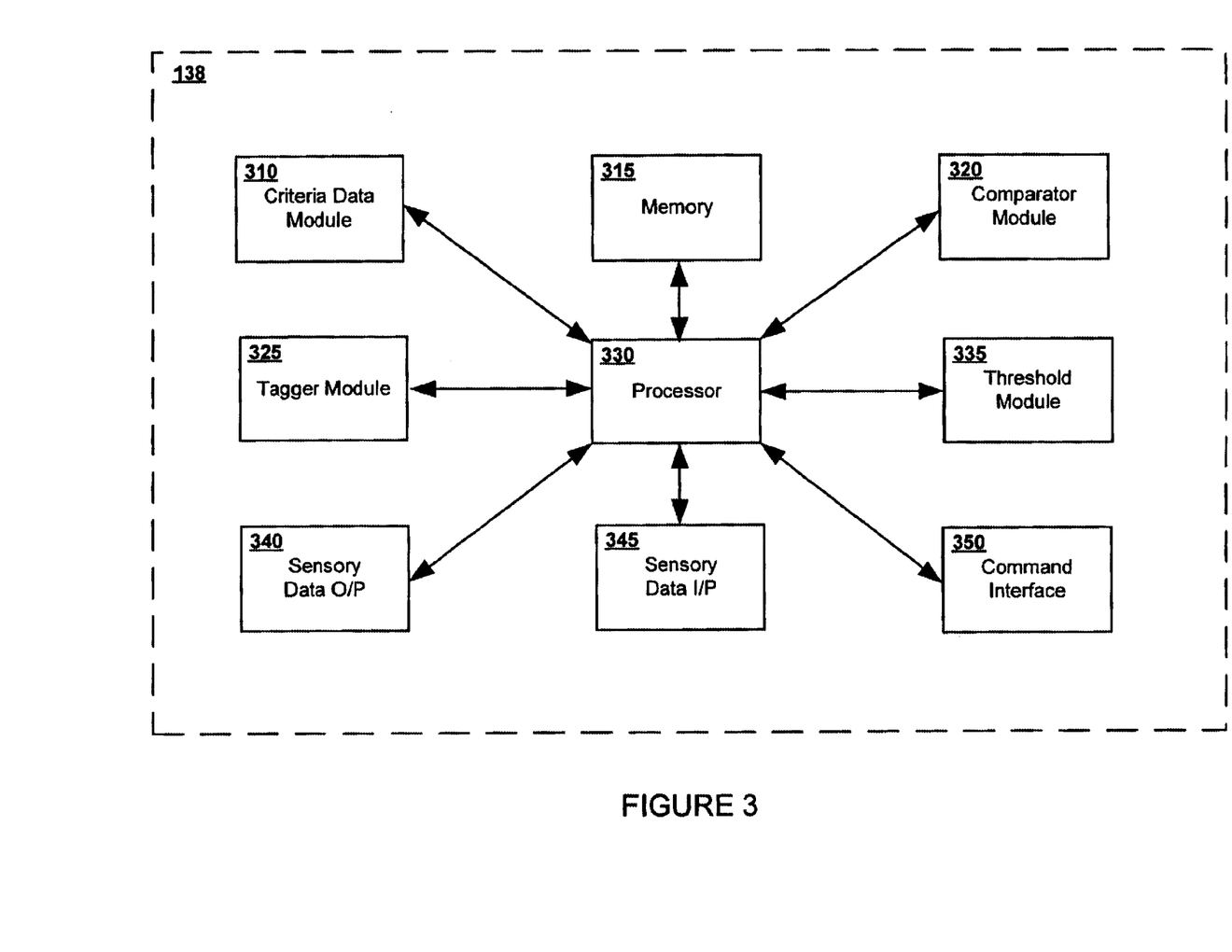
FIG. 3 illustrates an exemplary block diagram of the application module according to the invention.

Referring to FIG. 3, the application module 138 performs searching functions for the system 100 (FIG. 1.) In one embodiment, the application module 138 includes a criteria data module 310, a memory device 315, a comparator module 320, a tagger module 325, a processor 330, a threshold module 335, a sensory data output 340, a sensory data input 345, and a user interface 350. The criteria data module 310, memory device 315, comparator module 320, tagger module 325, threshold module 335, sensory data output interface 340, sensory data input interface 345, and command interface 350 are connected to the processor 330.

The components 310–350 are merely illustrated in FIG. 3 as one embodiment of the application module 138. Although the components 310–350 are illustrated in FIG. 3 as separate components of the application module 138, two or more of these components may be integrated, thus decreasing the number of components in the module 138. Similarly, the components 310–350 may also be separated, thus increasing the number of components within the module 138. Further, the components 310–350 may be implemented in any combination of hardware, firmware and software.

The sensory data input interface 345 receives a sequence of sensory data from outside the application module 138. The command interface 350 receives the specific search command for use within the application module 138. The command interface 350 may receive the search command from a user or another device. In the context of one specific application of auto racing, exemplary search commands include pit stops, car crashes, spin-outs, yellow flag, checkered flag, and specific cars/drivers.

In one embodiment, the criteria data module 310 stores a plurality of predefined search criteria. The criteria data module 310 receives a specific search command through the command interface 350 and selects an appropriate predefined search criteria based on the search command. A predefined search criteria may include position data, force data, frequency of events occurring, and the like. For example, one predefined search criteria may be a search for spin-outs during a car race. In this example, the search parameters include searching the sensory data for a car that completes a rotation within a limited amount of time. Another predefined search criteria may be a search for cars making pit stops during a car race. In this example, the search parameters may include searching the sensory data for a car that is positioned within the pit area during the race. In another embodiment, the criteria data module 310 may create an additional predefined search criteria based on the specific search command.

The comparator module 320 receives the sequence of sensory data and compares this sequence with the search parameters from the predefined search criteria. The comparator module 320 identifies a match the predefined search criteria with the sequence of sensory data.

The threshold module 335 analyzes matches identified by the comparator module 330. If the match between the predefined search criteria and the sensory data meets or exceeds a predetermined threshold, the threshold module 335 authenticates this match.

The tagger module 325 receives the authenticated match from the threshold module 335. In response to the authenticated match, the tagger module 325 highlights the particular sensory data within the sequence of sensory data such that the highlighted sensory data is distinguished from the entire sequence of sensory data. The highlighted sensory data corresponds with the particular sensory data associated with authenticated match.

The sensor data output module 340 presents a sequence of sensory data with highlighted portions for use outside of the application module 138.

Figure 4:
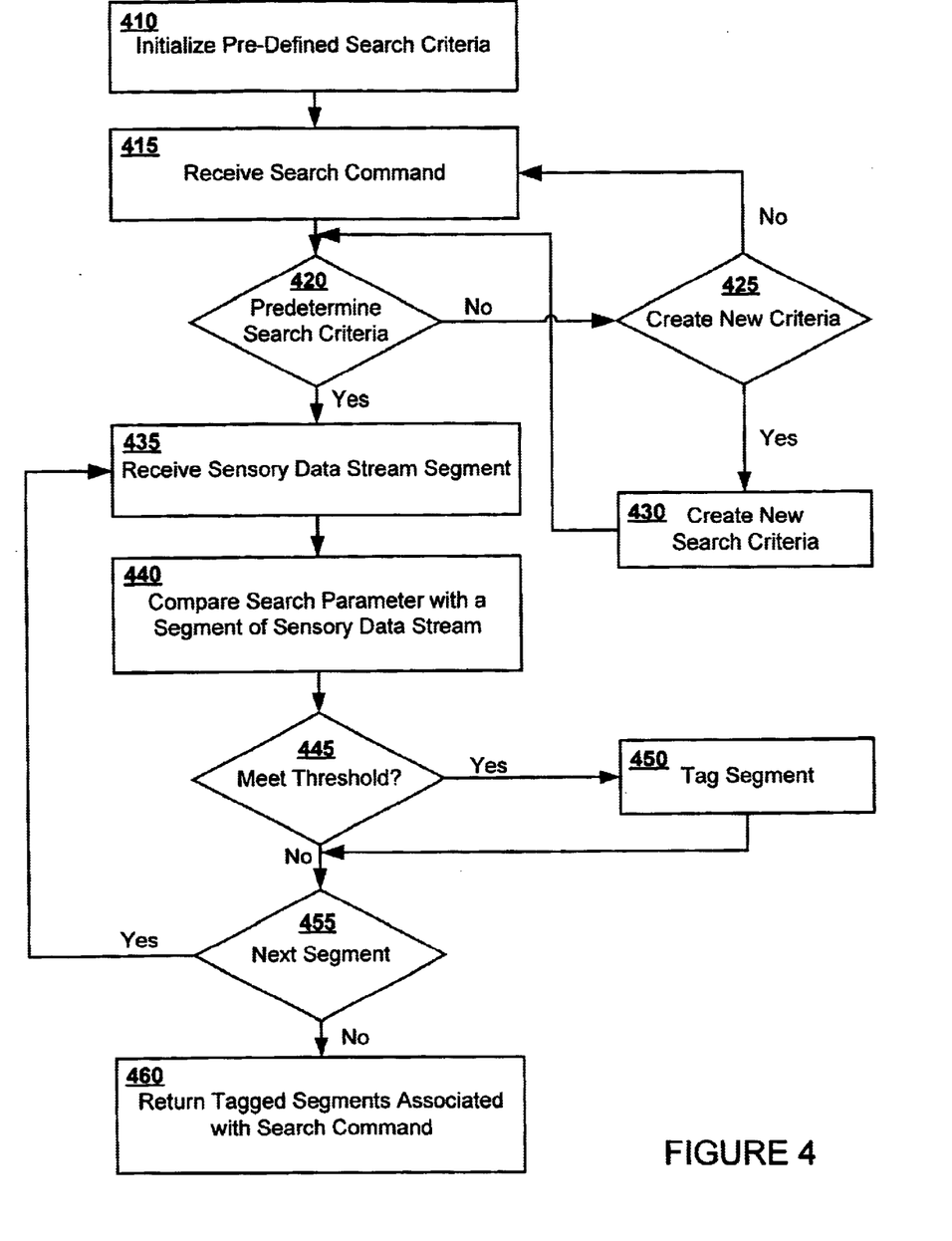
FIG. 4 illustrates an exemplary process flow diagram of searching for content within an audio/visual segment according to the invention.

The operation of the system 100 while searching for sensory data corresponding with A/V data is described with references to the flow diagram shown in FIG. 4. At Block 410, a plurality of predefined search criteria are initialized. The predefined search criteria described in Block 410 is similar to the predefined search criteria previously described under the search criteria data module 310 (FIG. 3.) At Block 415, a search command is received. At Block 420, the search command (received in the Block 415) is compared with the plurality of predefined search criteria (initialized in Block 410). If one of the plurality of predefined search criteria sufficiently matches the search command, then a sensory data stream sequence is received in Block 435.

If the search command is not matched with one of the plurality of predefined search criteria, then an option of creating a new predefined search criteria is available in Block 425. If creating a new predefined search criteria is not desired, then another search command is received in the Block 415. However, if a new predefined search criteria is desired, then a new search criteria is formed and becomes part of the plurality of predefined search criteria in Block 430. Next, the original search command is compared with the plurality of predefined search criteria in Block 420.

In Block 435, a segment of the sensory data stream sequence is received. The parameters within the search criteria are compared with the segment of the sensory data stream sequence in Block 440. A threshold is applied to determine whether a valid match between the segment of the sensory data stream sequence and the parameters within the search criteria match in Block 445. If there is a valid match, then the segment of the sensory data stream is tagged or highlighted in Block 450. In Block 455, a next segment of the sensory data stream sequence is examined. When there are no more segments, the highlighted segments of the sensory data stream corresponding to the search command are returned.

The flow diagram as depicted in FIG. 4 is merely one embodiment of the invention. The blocks may be performed in a different sequence without departing from the spirit of the invention. Further, blocks may be deleted, added or combined without departing from the spirit of the invention.

Figure 5:
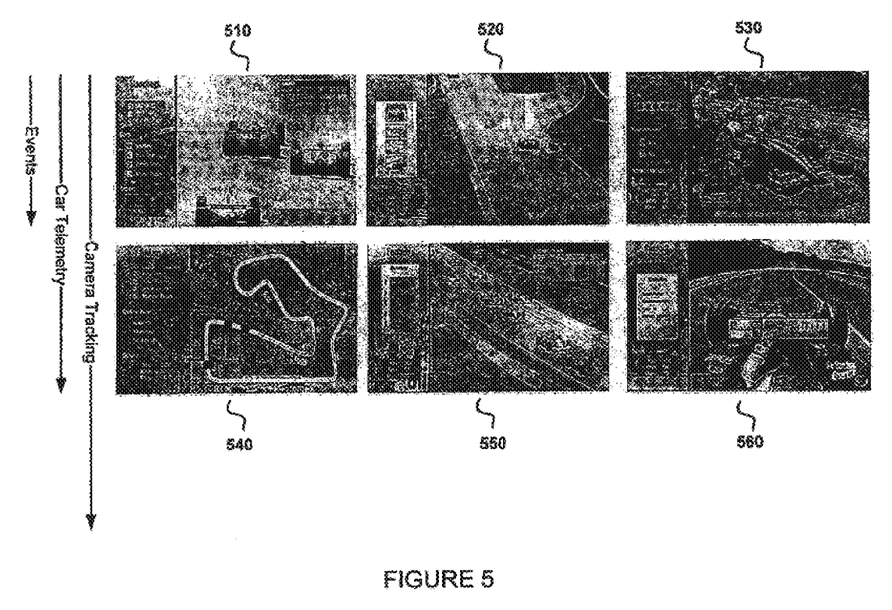
FIG. 5 illustrates examples of sensory data utilizing an auto racing application according to the invention.

FIG. 5 illustrates exemplary forms of sensory data within the context of an auto racing application. Screenshot 510 illustrates use of positional data to determine the progress of the individual cars relative to each other, relative to their location on the track, and relative to the duration of the race. Screenshot 520 illustrates use of positional data to detect a car leaving the boundaries of the paved roadway as well as force data indicating changes in movements of the car such as slowing down rapidly. Screenshot 530 illustrates use of positional data to detect a car being serviced in the pit during a stop. Screenshot 540 illustrates use of positional data to determine the order of the cars and their locations on the race track. Screenshot 550 illustrates use of force data to show the accelerative forces being applied to the car and felt by the driver. In practice, sensory data is generally collected by a number of various specialized sensors. For example, to track the positional data of the cars, tracking sensors can be placed on the cars and radio waves from towers in different locations can triangulate the position of the car. Other embodiments to obtain positional data may utilize global positioning systems (GPS). To track the force data of the cars, accelerometers can be installed within each car and communicate the forces via radio frequencies to a base unit.

Figure 6A:
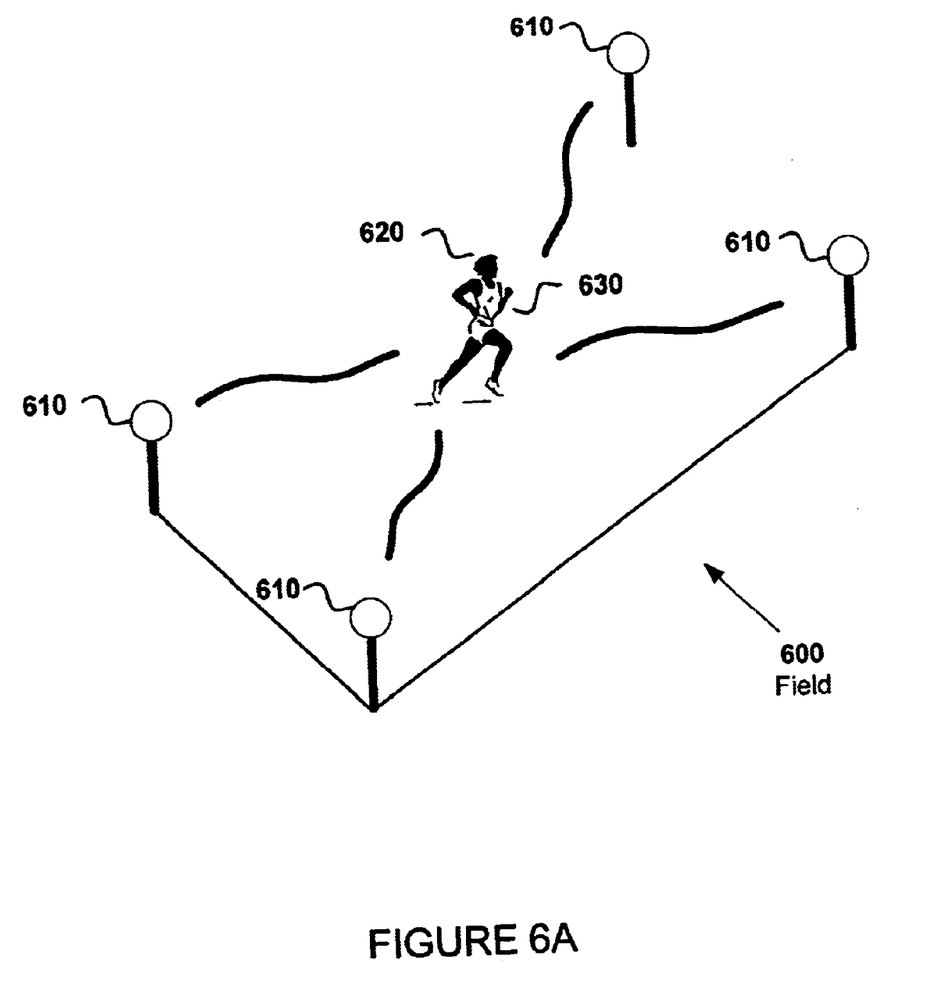
FIG. 6A illustrates examples of sensory data utilizing a football application according to the invention.

FIG. 6A illustrates exemplary forms of sensory data within the context of a football application. A playing field 600 is surrounded by a plurality of transceiver towers 610. The playing field 600 is configured as a conventional football field and allows a plurality of players to utilize the field. An exemplary football player 620 is shown on the playing field 600. The football player 620 is wearing a sensor 630. The sensor 630 captures positional data of the football player 620 as the player traverses the playing field 600. The sensor 630 is in communication with the plurality of transceiver towers 610 via radio frequency. The plurality of transceiver towers 610 track the location of the sensor 630 and are capable of pinpointing the location of the sensor 630 and the football player 620 on the playing field 600. In another embodiment, the coverage of the plurality of transceivers 610 is not limited to the playing field 600. Further, tracking the location of multiple players is possible. In addition to the sensor 630 for tracking the location of the player, force sensors can be utilized on the player to measure impact forces and player acceleration.

Figure 6B:
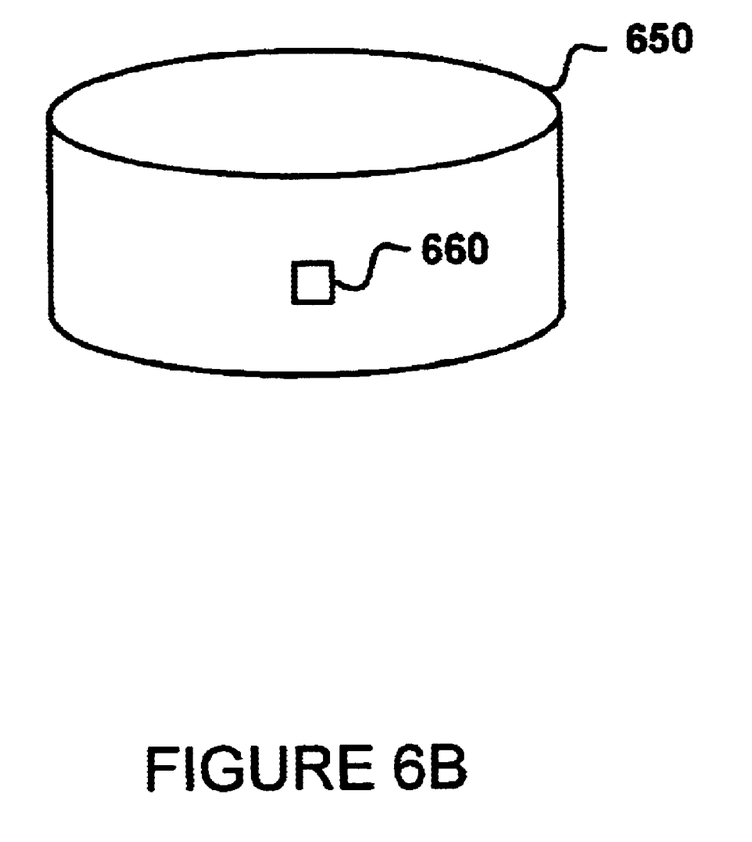
FIG. 6B illustrates examples of sensory data utilizing a hockey application according to the invention.

FIG. 6B illustrates exemplary forms of sensory data within the context of a hockey application. A hockey puck 650 is shown with infrared emitters 660 residing within the hockey puck 650. The infrared emitters 660 are detected by special cameras mounted high in the arena. The positions of the cameras are fixed and known so the puck position can be triangulated. Accordingly, the infrared emitters 660 allow the generation of sensory data indicating the location of and the accelerative forces on the hockey puck 650.

The foregoing descriptions of specific embodiments of the invention have been presented for purposes of illustration and description. For example, the invention is described within the context of auto racing and football as merely embodiments of the invention. The invention may be applied to a variety of other theatrical, musical, game show, reality show, and sports productions.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of searching for A/V content data comprising:
    a. receiving sensory data corresponding to the A/V content data, wherein the sensory data and the A/V content data are temporally correlated; and
    b. matching the sensory data with a predefined search criteria.

2. The method according to claim 1 further comprising creating the predefined search criteria based on specific parameters of the sensory data.

3. The method according to claim 1 wherein the predefined search criteria is configured to search for an event.

4. The method according to claim 3 wherein the event is a spin-out.

5. The method according to claim 3 wherein the event is a car crash.

6. The method according to claim 1 further comprising synchronizing the sensory data with the content data.

7. The method according to claim 1 wherein the sensory data is represented in real-time.

8. The method according to claim 1 wherein the sensory data describes position data.

9. The method according to claim 1 wherein the sensory data describes a force.

10. A method of searching for a specific segment within a stream of A/V content data comprising:
    a. receiving a stream of sensory data corresponding with the stream of A/V content data, wherein the stream of sensory data is temporally correlated with the stream of A/V content data;
    b. comparing the stream of sensory data with a search criteria; and
    c. identifying the specific segment of the stream of content data corresponding to a match between the stream sensory data and the search criteria.

11. The method according to claim 10 further comprising setting the search criteria based upon parameters of the stream of sensory data.

12. The method according to claim 10 further comprising applying a threshold to determine the match between the stream of sensory data and the search criteria.

13. The method according to claim 10 wherein the stream of content data is video data.

14. The method according to claim 10 wherein the stream of content data is audio data.

15. The method according to claim 10 wherein the stream of sensory data is represented by position data.

16. The method according to claim 10 wherein the stream of sensory data is represented by force data.

17. The method according to claim 10 further comprising creating the stream of sensory data via a plurality of sensors.

18. A system for locating a specific segment within a stream of content data comprising:
    a. a search criteria module for storing a search criteria parameter;
    b. a comparator module connected to the search criteria module for finding a match between the search criteria parameter and a stream of sensory data wherein the stream of sensory data corresponds with the stream of content data;
    c. a threshold module connected to the comparator module for verifying the match; and
    d. a tagger module connected to the threshold module for highlighting the specific segment based on the match verified by the threshold module.

19. The system according to claim 18 further comprising a real-time data streamer connected to the comparator module for supplying the stream of sensory data.

20. The system according to claim 18 further comprising an A/V source for supplying the stream of content data.

21. A system comprising:
    a. means for receiving sensory data corresponding to A/V content data;
    b. means for matching the sensory data with a predefined search criteria; and
    c. means for synchronizing the sensory data with the A/V content data.

* * * * *